D. R. BOWEN AND C. F. SCHNUCK.
RUBBER MIXER.
APPLICATION FILED JAN. 13, 1919.
1,357,217.
Patented Nov. 2, 1920.
2 SHEETS—SHEET 1.
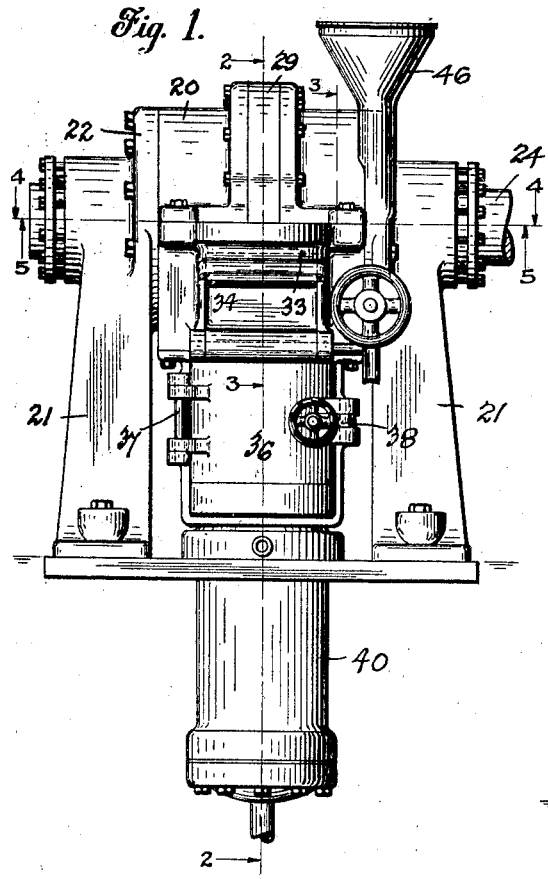
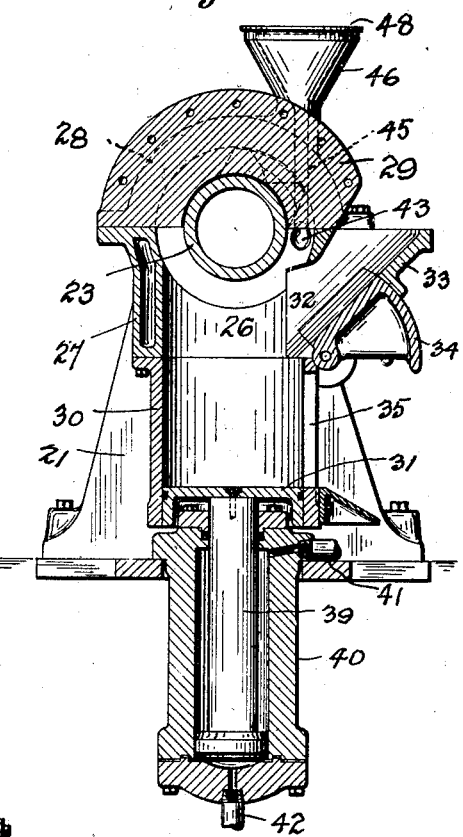
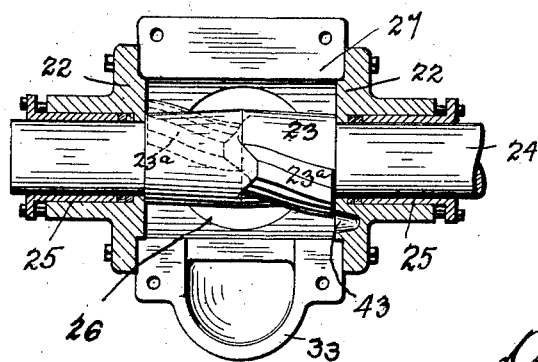
Inventors:
David R. Bowen and
Carl F. Schnuck,
By
Attorney

D. R. BOWEN AND C. F. SCHNUCK.
RUBBER MIXER.
APPLICATION FILED JAN. 13, 1919.

1,357,217.

Patented Nov. 2, 1920.
2 SHEETS—SHEET 2.

Inventors
David R. Bowen and
Carl F. Schnuck,
By
Attorney

UNITED STATES PATENT OFFICE.

DAVID R. BOWEN AND CARL F. SCHNUCK, OF ANSONIA, CONNECTICUT, ASSIGNORS TO FARREL FOUNDRY AND MACHINE COMPANY, OF ANSONIA, CONNECTICUT, A CORPORATION OF CONNECTICUT.

RUBBER-MIXER.

1,357,217. Specification of Letters Patent. Patented Nov. 2, 1920.

Original application filed September 18, 1917, Serial No. 192,030. Divided and this application filed January 13, 1919. Serial No. 270,838.

*To all whom it may concern:*

Be it known that we, DAVID R. BOWEN and CARL F. SCHNUCK, both citizens of the United States, and both residing in Ansonia, county of New Haven, State of Connecticut, have invented certain new and useful Improvements in Rubber-Mixers, of which the following is a full, clear, and exact description.

This invention relates to rubber mixers of the kind described in our application, Serial No. 192030, of which the present application is a division.

The present improvements relate especially to a method of and means for charging material into the working chamber in which the mixing operation takes place under the action of the rotary mixing element. The material is worked back and forth in the chamber from one end to the other by blades on the rotor, until the mass, (which usually consists initially of rubber chunks and powdered pigment or filling material) is reduced to the desired homogeneity and plasticity.

One of the primary objects of our invention is to furnish a machine of this type, and a method of operating the same, whereby the material can be charged into the mixing chamber in a very simple and convenient way.

Another object of the invention is to provide a rubber mixer wherein material to be mixed can be readily charged by gravity into a mixing chamber in which the material is being worked back and forth, during the operation of mixing.

Another object of the invention is to furnish a rubber mixer in which the material is worked back and forth in the chamber under heavy pressure of the rotor during mixing but in which, nevertheless, material to be mixed can be introduced into the chamber freely during rotation of the rotor. For this purpose an opening in the end wall of the chamber is provided which is so located that such material is conducted easily into a void or area of low pressure at the rear face of one of the rotor blades, whence it is taken up and mixed with the mass.

To these and other ends, the invention consists in the novel features and combinations of parts to be hereinafter described and claimed.

In the accompanying drawings,

Figure 1 is a front elevation of a rubber mixer embodying our invention.

Fig. 2 is a transverse central section of the machine taken on line 2—2 of Fig. 1.

Fig. 4 is a section on line 4—4 of Fig. 1, looking down, showing the rotor in place.

Figure 3:
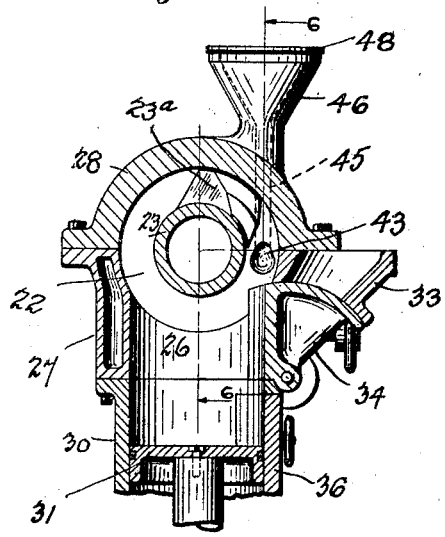
Fig. 3 is a vertical transverse section on line 3—3 of Fig. 1.
Figure 5:
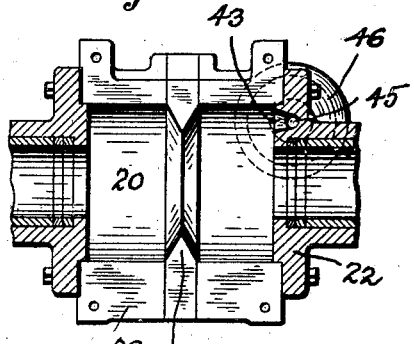
Fig. 5 is a section on line 4—4 of Fig. 1, looking up, the rotor being omitted.
Figure 6:
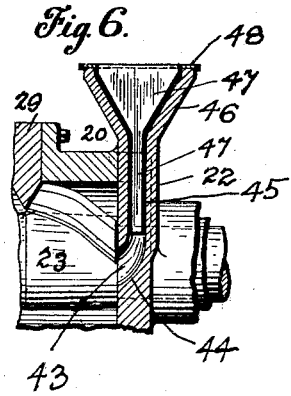
Fig. 6 is a fragmentary longitudinal section of the machine.

In its general features, the machine selected for illustration is the same as that disclosed in our application, Serial No. 192030, previously mentioned. The mixing chamber 20, of generally cylindrical shape, is mounted between suitable standards or end frames 21 having heads 22 which close the cylinder at the respective ends. A rotary mixing element or rotor 23 having a horizontal shaft 24 with bearings 25 in the cylinder heads is arranged within the mixing cylinder. The top part of the chamber is closed, but at the bottom, said chamber is provided with a discharge opening 26, formed in a casting 27, which constitutes approximately the lower half of the chamber. The upper section 28 of the chamber is provided with an intermediate transverse extrusion rib 29, which coöperates with the blades of the rotor, in the manner described in our application, Serial No. 191413. The rotor is provided with blades 23ª diametrically located on the rotor shaft, one of said blades being located on one side of the extrusion rib, and the other being located on the other side. These blades are arranged at such an angle on the shaft as to work the material back and forth in the mixing chamber and squeeze it through the space between the extrusion rib and intermediate part of the rotor. The blades make substantial contact with the respective end walls of the mixing chamber and each blade has a working face which forces the material toward the center of the chamber and simultaneously meshes or smears it against the side wall of the chamber before it reaches the extrusion rib. In this manner, the material is pressed and squeezed back and forth in the mixing chamber by the rotor blades, as described in our application, Serial 191413.

The lower section chamber 27, is supported on the upper end of a cylinder 30 for a pressure piston 31, the opening 26 of the lower chamber section being in line with the piston 31, so that the latter can move up into the lower chamber section in close proximity to the rotor blades. The main charging opening 32 is formed in section 27 at the front of the machine, said opening 32 being located at the lower part of a charging hopper 33. The charging opening is controlled by a suitable gate or valve 34, which is operated in the manner described in the parent application. The cylinder 30 is provided at the front of the machine beneath the charging opening 32 with a discharge opening 35 which can be closed by a swinging door 36. The door is hinged at one side of the opening 35 by a hinge 37, and at the opposite or free edge of the door, a locking device 38 is provided. The piston 31 is provided with a downwardly extended piston rod 39 working in a hydraulic cylinder 40. Suitable pressure fluid connections 41, 42 permit the raising and lowering of the piston 31 in a manner which it will not be necessary to describe in detail.

In addition to the main charging hopper, we provide the mixing chamber with a supplementary charging opening by means of which filling or coloring matter can be added to the batch during the mixing. In the example shown, we provide an inlet port 43 in one of the cylinder heads 22, at a point which is immediately adjacent an end edge of one of the blades, at some time during rotation of such blade. This inlet port 43 which is eccentrically located with respect to the cylinder head so as to lie in the path of rotation of the blade or blades in that end of the cylinder, may advantageously be slanted or relieved on the lower side, as shown at 44, so as to permit the rubber to slide by and the pigment to slide into the chamber. The port communicates with a bore or passage 45 in the cylinder head, which leads up to a charging hopper 46 mounted on the end of the mixing chamber. In the hopper 46 and passage or duct 45, an agitator of suitable kind may be provided for stirring the powder or other material which is being introduced into the mixing chamber so as to prevent it from becoming clogged in the hopper or in the passage leading downwardly therefrom. In the form shown, the agitator 47 comprises a cap piece 48, adapted to rest on the upper edge of the hopper and having a sheet metal plate extending down into and fitting against the side wall of the hopper and the passage 45. By rotating the agitator, the material will be scraped off the surfaces of the charging device to which it adheres, so that it will pass freely by gravity into the passage 45 and thence into the mixing chamber.

The operation of the machine is substantially as follows: Supposing the parts to be in the position shown in Fig. 2, the door 36 is closed and locked, and the rubber or other material to be treated is charged into the cylinder 30, through the hopper 33, and main charging opening 32. The gate 34 is then closed, and the pressure piston 31 is raised, so as to carry the material up in the cylinder 30, and in the lower part of casing section 27, into contact with the blades of the rotor 23, which at this time is in rotation. Thus the piston 31 carries the material into working position and, the fluid pressure on the piston being continued, the latter holds the material tightly in contact with the rotor blades, so that such blades will have a very thorough kneading or working action, the blades at opposite sides of the rib 29 smearing the mass against the side wall of the chamber, and at the same time forcing it toward the center, as previously described.

Filling or coloring matter can be added to the batch, during the mixing, by way of the hopper 46 and its associated duct 45 and inlet port 43. In spite of the fact that the batch of material in the chamber is subjected to relatively heavy pressure by the piston or ram 31, the spaces at the rear faces of the rotor blades 23$^a$ are not completely filled with material, and in such spaces there exist voids or areas of low pressure caused by the rotation of the blades. We find that material to be mixed, for example powdered pigment, can be readily introduced into the mixing chamber if it is injected into the vacant space or spaces back of the blade or blades. The powder or other material introduced into the hopper 46 slides down by gravity through the duct 45 and inlet port 43 into one end of the mixing chamber. At one point in the rotation of the corresponding blade, the inlet port 43 is wholly or partly cut off by the end edge of the blade, but when the blade passes beyond the inlet port, there is a free passage for the material into the mixing chamber in the area of low pressure at the rear face of the blade. The material at this time slides into the mixing chamber, and is added to and mixed with the batch of material already in the chamber.

When the treated mass has become plastic and homogeneous, and it is desired to discharge the machine, the piston 31 is lowered by suitable manipulation of the fluid pressure valves and the material drops down into the cylinder 30 with the piston. The material is stripped off from the rotor and falls down onto the upper surface of the piston. The door 36 being then opened, the material can be readily taken out of the cylinder 30.

It will be obvious that we do not limit ourselves in all aspects of the invention to a machine in which an opening at one end of the mixing cylinder for the charging or feeding of the material is a supplementary or auxiliary charging opening. We have discovered that a machine of the character shown may be advantageously charged or fed from the end during the rotation of the mixing blades owing to the existence of one or more low pressure areas or voids at the chamber end behind the rotor blade or blades. Into such a low pressure area or void, material to be treated may be charged readily by gravity and such material need not necessarily be in powdered form, as various changes in the procedure herein described, as well as in the details of the apparatus, may be made without departing from the scope of our invention.

We do not claim herein the provision of a rubber mixer having means for charging the working chamber from beneath, as claimed in our application Serial No. 192,030, above mentioned.

Furthermore, we do not claim herein the means for or method of mixing rubber or similar material by a mixing extrusion action, as claimed in our applications, Serial Nos. 191,413 and 223,537, respectively.

What we claim is:

1. In a machine of the character described, a working chamber, a rotor therein which forces the material back and forth in said chamber, said chamber having a charging opening in its end wall.

2. In a machine of the character described, a working chamber, and a rotor in said chamber which forces the material alternately from one end of the chamber to the other, said chamber having a charging opening at one end thereof.

3. In a machine of the character described, a working chamber, a rotor in said chamber which alternately works the material from one end of the chamber to the other, said chamber having a charging opening in its end wall, and a hopper associated with said charging opening.

4. In a machine of the character described, a horizontally arranged working chamber, a rotor therein for working the material back and forth in said chamber, means for charging the main part of the material into the chamber, and a supplementary charging hopper for coloring material or the like, leading into the chamber.

5. In a machine of the character described, a horizontally arranged working chamber, a rotor therein for working the material back and forth in said chamber, means for charging the main part of the material into the chamber, and a supplementary charging hopper for coloring material or the like, leading into the chamber at one end of the latter.

6. In a machine of the character described, a working chamber, a horizontal rotor in said chamber for working the material back and forth, said chamber having a charging opening in the end wall thereof, a charging hopper in communication with said opening, and an agitator located within the hopper.

7. In a rubber mixer, a working chamber, a bladed rotor therein for moving the material in said chamber from one end of the same toward the other and back again while maintaining it in contact with the chamber wall and thereby mixing said material, said chamber having an end opening through which the material is moved into a void in the chamber.

8. In a rubber mixer, a working chamber, and a horizontally disposed rotary element in said chamber having a blade with a front face for mashing and mixing the material, said chamber having a charging opening through which material to be treated is conducted into the space at the rear face of the blade as the latter rotates.

9. In a rubber mixer, a working chamber, a horizontal rotary element therein having a blade for mashing the material against the side wall of the chamber and simultaneously moving it away from the end of the chamber, said chamber having an end charging opening for material to be treated, through which the material is conducted by gravity into the space behind the blade.

10. In a rubber mixer, a working chamber, a horizontal rotary element therein having a blade for mashing the material against the side wall of the chamber and simultaneously moving it away from the end of the chamber, said chamber having a charging opening for material to be treated, through which the material is conducted by gravity into the space behind the blade, said charging opening being located in the end wall of the working chamber.

11. In a rubber mixer, a working chamber, a rotary shaft therein having inclined blades with front faces which mash the material against the side wall of the chamber and advance it from the ends of the chamber toward the center, said chamber having an opening for the charging by gravity of material to be treated, said opening being so located that such material is conducted into a void or area of low pressure at the back of one of said blades, while said shaft rotates.

12. In a rubber mixer, a horizontal working chamber, a horizontal shaft journaled therein, blades on said shaft having front faces for mashing the material against the side wall of the chamber, said blades being inclined to work the material from the ends toward the center of the chamber, said chamber having a charging opening in one of its end walls through which material to be treated is charged by gravity into a void at the rear face of one of said blades.

13. In a rubber mixer, a working chamber, a bladed rotor therein for working the material back and forth in said chamber, said chamber having an opening in one of its end walls through which material may be charged by gravity during the mixing operation.

14. In a rubber mixer, a working chamber, a bladed rotor therein for working the material back and forth in said chamber, said chamber having an opening in one of its end walls through which material is charged by gravity during the mixing operation into a void at the rear face of one of the rotor blades.

15. In a rubber mixer, a working chamber, a rotor therein, having blades in substantial contact with the respective end walls of the chamber and arranged to move the material back and forth in said chamber, said chamber having an opening in one of said ends walls for the ingress of material to be treated.

16. In a rubber mixer, a working chamber, a rotor therein, having blades in substantial contact with the respective end walls of the chamber and arranged to move the material back and forth in said chamber, said chamber having an opening in one of said end walls for the ingress of material to be treated, said opening being located in the path of one of the rotor blades and alternately covered and uncovered by such blade.

17. In a rubber mixer, a working chamber, having an end wall, a rotor in said chamber having a blade rotating in substantial contact with said end wall and adapted to move the material away from said wall toward the center of the chamber, said chamber having a feed opening in said end wall alternately closed and opened by said blade as the latter rotates.

18. In a rubber mixer, a working chamber having a curved side wall and a substantially flat end wall, a rotor in said chamber having a blade adapted to rotate in substantial contact in said end wall and to move material away from said end wall toward the center of the chamber, said end wall having an opening therein by means of which material is fed into the chamber, and a hopper leading to said opening.

19. In a rubber mixer, a working chamber having a curved side wall with a discharge opening in the bottom, and flat end walls, a rotor in said chamber having blades rotating in substantial contact with the respective end walls for moving the material back and forth in said chamber, said chamber having an inlet opening alternately closed and opened by one of said blades in the rotation thereof.

20. In a rubber mixer, a working chamber, a bladed rotor in said chamber for moving the material back and forth, said chamber having a feed opening alternately opened and closed by one of said blades in the rotation thereof.

21. In a rubber mixer, a working chamber, a bladed rotor in said chamber for moving the material back and forth, said chamber having a feed opening alternately opened and closed by one of said blades in the rotation thereof, said feed opening being adapted to communicate with a vacant space at the rear face of the blade.

22. The method of mixing rubber, which comprises working the material back and forth in a suitable mixing chamber by means of suitable rotary mixing blades, and introducing additional material into the chamber from the end of such chamber.

23. The method of mixing rubber, which comprises working the material back and forth in a suitable mixing chamber by means of suitable rotary mixing blades, and introducing additional material into the chamber from the end of such chamber in the void at the rear face of one of such blades.

24. The method of introducing material into a rubber mixer having a mixing chamber and a rotary blade therein, which comprises feeding the material into the space behind the rotating blade.

25. The method of introducing material into a mixer having a mixing chamber and rotating blades therein for working the material back and forth in said chamber, which comprises feeding the material through one of the end walls of the mixing chamber into the vacant space at the rear face of one of the blades.

26. The method of mixing powdered filling material or pigment with rubber which is being worked in a rubber mixer consisting of a mixing chamber with a rotor therein for working the mass back and forth in such chamber, which comprises introducing the powder through the head of the mixing chamber while the rubber mass is being worked by the rotor.

27. The method of incorporating powder with rubber or like chunks, which are being worked back and forth in a suitable mixing chamber, by rotating blades which comprises introducing the powder into one end of the mixing chamber and into the space behind one of the blades while the blades are acting on the mass.

28. The method of incorporating powder with rubber chunks or the like, which are being mixed by a rotating blade in a suitable mixing chamber, which comprises feeding the powder by gravity into the space behind the blade.

29. The method of incorporating powder with rubber chunks or the like, which are being mixed by a rotating blade in a suitable mixing chamber, which comprises feeding the powder by gravity into the space behind the blade through the end wall of the chamber.

30. The method of mixing rubber and the like in a suitable mixing chamber by means of rotating blades which work the material back and forth in said chamber, which comprises feeding material by gravity into the mixing chamber through the end of the latter at a point in the path of rotation of one of said blades, so that such material can be drawn into the space at the rear of the rotating blade.

In witness whereof, we have hereunto set our hands on the 8th day of January, 1919.

DAVID R. BOWEN.
CARL F. SCHNUCK.